3,801,683
PROCESS FOR PREPARING TRIALKYOPHOS-
PHATE
Yutaka Kodama and Tsutomu Kodama, Toyama, Masao
Nakabayashi, Nameriwa, and Hiroshi Hirano, Toyama,
Japan, assignors to Toyama Chemical Co., Ltd.
No Drawing. Filed Oct. 19, 1971, Ser. No. 190,668
Claims priority, application Japan, Oct. 20, 1970,
45/91,606
Int. Cl. C07f 9/08
U.S. Cl. 260—973       7 Claims

ABSTRACT OF THE DISCLOSURE

Trialkyl phosphates which are used as solvents or catalysts are produced by reacting alcohols with phosphorus oxychloride. The alcohols are employed in an amount in excess of the stoichiometric amount. The excess alcohol is distilled from the reaction mixture of trialkyl phosphates and then continuously absorbed in and reacted with phosphorus oxychloride to produce alkylchlorophosphate. Alcohol is then added to the resulting alkylchlorophosphate, to produce a reaction mixture of trialkylphosphate. The alcohol which is produced in said process is recycled to succeeding reaction steps to obtain the desired trialkylphosphate on an industrial scale.

---

This invention relates to a process for the preparation of a trialkylphosphate by reacting phosphorus oxychloride with the corresponding alcohols, and more particularly to a distillation of excess alcohols and/or hydrogen chloride produced by a side-reaction, under reduced pressure, while recovering the excess alcohol from the reaction mixture solution.

Previously, in order to remove undesirable by-products, such as hydrogen chloride, produced in the preparation of the desired trialkylphosphate, the byproducts were distilled off under reduced pressure. A disadvantage was that it often proved to be impossible to remove the hydrogen chloride byproducts from the reaction mixture due to the tendency of the hydrogen chloride to dissolve in the alcohol. The reason for this is that the maximum azeotropic of a mixture consisting of alcohol and hydrogen chloride is similar to water. For example, the boiling point of a methyl-alcohol solution containing 19% by weight of hydrogen chloride is 73° C.

Additionally, the hydrogen chloride is distilled off along with the alcohol at a temperature less than or at approximately the boiling point of the alcohol and the hydrogen chloride byproducts decreases the amount of the desired trialkylphosphate produced. Another disadvantage of the conventional method is that the presence of the hydrogen chloride leads to the following side-reaction:

$$(RO)_3PO + HCl \rightarrow RCl + (RO)P(O)OH \qquad (A)$$

It is also difficult to recycle an alcohol recovered by the conventional process to subsequent reaction steps. This is because with the recycling of the alcohol the concentration of alcohol and hydrogen chloride in the reaction mixture increases, leading to decomposition of the desired trialkylphosphate.

Conventionally, trialkylphosphate has been produced by reacting phosphorus oxychloride with alcohol. A disadvantage is that the reaction velocity between the phosphorus oxychloride and alcohol decreases as the concentration of the hydrogen chloride byproduct increases and the yield of trialkylphosphate diminishes due to the decomposition of the trialkylphosphate.

In order to overcome the aforesaid disadvantages, it is necessary to add to the reaction mixture an amount of alcohol in excess of the stoichiometric amount required to react with the phosphorus oxychloride and to forthwith remove hydrogen chloride byproduct from the reaction solution.

The present inventors found, as a result of the examination of the above discussed disadvantages, that when an alcohol solution containing hydrogen chloride is reacted with phosphorus oxychloride the hydrogen chloride does not dissolve in the reaction solution containing phosphorus oxychloride, nor in the reaction solution containing alkylchloro phosphate which is an intermediate of trialkylphosphate, that only alcohol is absorbed in the phosphorus oxychloride and upon said absorption the phosphorus oxychloride is rapidly converted to alkylchlorophosphate; and that hydrogen chloride is selectively or alternatively eliminated from the reaction mixture. In addition, if alcohol is added to the reaction mixture containing the intermediate alkylchlorophosphate, the desired trialkylphosphate is produced in a shortened time.

An object of the present invention is to provide a process for producing a trialkylphosphate by reacting the corresponding alcohol with phosphorus oxychloride.

Another object of the present invention is to provide a process for producing a trialkylphospphate by reacting phosphorus oxychloride with the corresponding alcohol in a shortened reaction time.

Another object of this invention is to provide a process for producing a trialkylphosphate in a high yield by reacting phosphorus oxychloride with alcohol.

A further object of the present invention is to provide a process for producing a trialkylphosphate by reacting phosphorus oxychloride with an excess of the corresponding alcohol and recovering the excess alcohol and using it in subsequent process steps.

Other and further objects of the present invention will become apparent from a study of the specification and accompanying examples.

This invention comprises the process of producing trialkylphosphate by reacting an excess amount of the corresponding alcohol with phosphorus oxychloride; distilling off from the reaction mixture hydrogen chloride byproducts together with the remaining excess alcohol, said distillation being carried out under reduced pressure; recovering the distilled hydrogen chloride and excess alcohol; absorbing the recovered distilled excess alcohol in phosphorus oxychloride to produce an alkylchlorophosphate solution; and adding an additional quantity of said alcohol to the alkylchlorophosphate solution.

According to the present invention, the trialkylphosphate is produced by reacting phosphorus oxychloride with alcohol. The resultant reaction mixture, consisting of hydrogen chloride and the remaining excess alcohol, can be readily distilled. The excess alcohol is recovered and reused in succeeding reaction steps. The reaction mixture containing alkylchlorophosphate can be recycled. Hydrogen chloride is eliminated from the reaction system under reduced pressure. Additionally, it is also possible to obtain an alkylchlorophosphate and to forthwith remove hydrogen chloride by reacting the phosphorus oxychloride with the absorbed alcohol.

In the present invention, trialkylphosphate of the general formula:

$$(RO)_3PO \qquad (I)$$

(wherein R represents an alkyl group of 1 to 4 carbon atoms) is produced by reacting phosphorus oxychloride with an alcohol of the general formula:

$$ROH \qquad (II)$$

(wherein R is as defined above). The alcohol is employed in the reaction in an amount in excess of the stoichiomtric amount required for reaction with the phosphorus oxychloride. Th excess alcohol together with hydrogen chloride by-product produced in the reaction are distilled from the reaction mixture under reduced pressure. The desired trialkylphosphate (I) is produced according to the following flow diagram while recovering the corresponding alcohol.

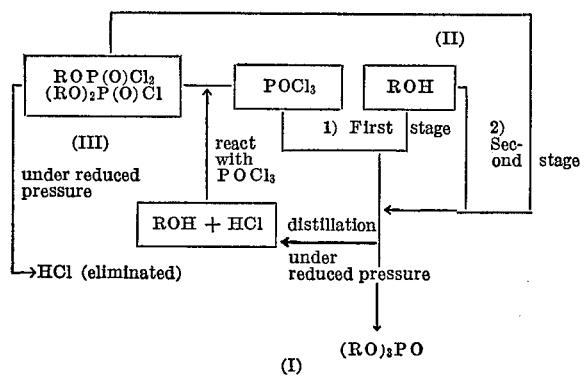

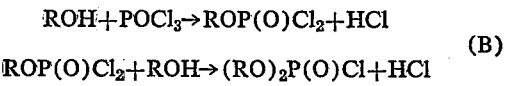

As shown in the above flow diagram, alkylchlorophosphates (III) of the general formulas ROP(O)Cl₂ and (RO)₂P(O)Cl [R is as previously defined above] are produced by reacting a greater than stoichiometric amount of the pure alcohol (II) with POCl₃, in a first stage, distilling off the excess alcohol and the hydrogen chloride, absorbing the distilled excess alcohol and hydrogen chloride in POCl₃ whereby the alkylchlorophosphates (III) are produced according to the reaction scheme:

$$ROH + POCl_3 \rightarrow ROP(O)Cl_2 + HCl$$
$$ROP(O)Cl_2 + ROH \rightarrow (RO)_2P(O)Cl + HCl$$

(B)

Additionally, it is possible to remove the hydrogen chloride byproduct of the reaction between phosphorus oxychloride with the absorbed alcohol, and to eliminate it from the reaction system together with the hydrogen chloride that is distilled off with the excess alcohol from said first stage. If too little ROH(II) is added to the solution, the reaction is activated and accelerates rapidly because hydrogen chloride does not remain in the mixture containing the trialkylphosphate in small amounts.

As previously mentioned, it is possible to recover alcohol under reduced pressure from the reaction mixture after reacting phosphorus oxychloride with the corresponding alcohol (II) under reduced pressure or at atmospheric pressure.

With our process, the alcohol being recovered is distilled off along with hydrogen chloride byproduct. After completion of the distillation in the primary stage the corresponding hydrogen chloride and alcohol which are distilled from the reaction mixture are continuously and recurrently absorbed into the cooled phosphorus oxychloride and the absorbed alcohol reacts rapidly with the phosphorus oxychloride to produce the corresponding alkylchlorophosphate. Upon production of the alkylchlorophosphate, hydrogen chloride produced in the reaction is isolated as a gas or liquid and rapidly eliminated from the reaction system together with the hydrogen chloride produced in the reaction of the phosphorus oxychloride with the corresponding alcohol in the primary stage and distilled over with the excess alcohol for absorption in the cooled phosphorus oxychloride. The reaction involved is set forth in reaction scheme (B).

Moreover, the excess alcohol which is not reacted remains in the solution of alkylchlorophosphates (III). In this recovery procedure, one can to some extent obtain pure alkylchlorophosphate (III) only. However, if insufficinet alcohol is used to obtain the desired trialkylphosphate (I), the trialkylphosphate can be formed rapidly without undergoing decomposition acording to the previously discussed reaction scheme (A), by adding an additional quantity of alcohol to the solution of alkylchlorophosphate (III) because hydrogen chloride is removed and is not present in the alkylchlorophosphate solution to any significant degree.

Accordingly, it is possible to obtain the desired product (I) by adding alcohol (II) to the reaction solution of intermediate (III).

An important advantage of this invention is that it enables one to produce the intermediate (III) using alcohol recovered from the first stage. Additionally, the present invention enables one to accelerate the reaction velocity and thereby shorten reaction time. Still further, the alcohol is recovered in a high yield.

The following alcohols are preferred in the method of the present invention:

Methanol, ethanol, n-propylalcohol, iso-propyl alcohol, n-butanol, iso-butanol, and tert-butanol.

In practicing the present invention, the desired product (I) may be obtained by reacting phosphorus oxychloride at a temperature of −10° to 50° C. with an excess of the alcohol (II), said excess being from 1 to 8 mols over the stoichiometric amount. The excess alcohol and hydrogen chloride produced in the reaction are distilled from the reaction mixture at a temperature of 20° to 120° C. under reduced pressure of 20 to 50 mm. Hg. In this case, the recovery and the removal of the excess alcohol and/or hydrogen chloride is carried out by passing through a heat exchanger having a temperature of about 20° C. to 120° C. under reduced pressure [Flash distillation system (method)]. After removal and recovery of the excess alcohol and hydrogen chloride byproduct from the reaction mixture, the recovered gaseous or liquid alcohol and hydrogen chloride are continuously absorbed in cooled phosphorus oxychloride.

The temperature of the cooled phosphorus oxychloride is preferably −20° C. to 5° C. The normal solidifying point of phosphorus oxychloride (2° C.) is decreased when phosphorus oxychloride is combined with the alkylchlorophosphate or the corresponding alcohols. At a temperature of −20° C. to 5° C., the absorbed ROH(II) reacts very rapidly with the phosphorus oxychloride and forms ROP(O)Cl₂, and/or (RO)₂P(O)Cl alkylchlorophosphate (III). The hydrogen chloride which is distilled over with the excess alcohol is readily removed from the reaction system. An additional quantity of the alcohol (II) is then added to the alkylchlorophosphate (III) and reacted therewith to form (I), i.e., the desired trialkylphosphate, (RO)₃PO(I).

With the present invention it is possible to recover and recycle the excess alcohol employed in the first stage and use same to produce the desired product (I) (RO)₃PO.

Furthermore, if any hydrogen chloride by-product remains in the trialkylphosphate end product (I), it can be neutralized preferably with aqueous alkali.

The following examples are given to more fully illustrate the present invention. The examples are for illustrative purposes only and the invention is not meant to be limited to the specific details of the examples. The alcohol (II) and the solution of alkylchlorophosphates (III) are recurrently recycled to the second sttage (2) as depicted in the flow diagram previously set forth.

EXAMPLE I

Preparation of tri-methylphosphate and recovery of methanol in the reaction mixture To 320 g. (10.0 mol) of methanol, 192.0 g. (1.25 mol) of phosphorus oxychloride were added dropwise and reacted at 10 to 15° C. After completion of the reaction, the resulting reaction mixture was heated to 20° C. to 25° C. under reduced pressure of 40 to 45 mm. Hg to distill off the remaining methanol and the hydrogen chloride.

The distillate consisting of methanol and hydrogen chloride was forthwith absorbed in 192.0 g. (1.25 mol) of phosphorus oxychloride at a temperature of −5° to 0° C., whereby 135.3 g. (0.937 mol) of dimethyl chlorophosphate and 180 g. (5.63 mol) of methanol were obtained. The yield of the recovered methanol was 90.0%.

Moreover, after the alcohol was recovered, 145.0 g. of trimethyl phosphate, amounting to a yield of 82.8%, were obtained from the methanol-phosphorus oxychloride reaction solution. After the reaction of the absorbed methanol with the cool phosphorus oxychloride, 139.8 g. (4.37 mol) of methanol were added to the resultant alkylchlorophosphate solution and reacted therewith. After this reaction, the above-mentioned procedure was repeated. 144.5 g. of tri-methylphosphate were obtained representing a yield of 82.5%.

EXAMPLE II

Preparation of tri-ethylphosphate and recovery of ethanol 192.0 g. (1.25 mol) of phosphorus oxychloride were added, dropwise, to 460.0 g. (10.0 mol) of ethanol, at a temperature of 15 to 20° C. and reacted. After completion of the reaction, unreacted excess ethanol and hydrogen chloride produced in the reaction were distilled from the reaction mixture under reduced pressure of 35 to 40 mm. Hg and at a temperature of 40 to 45° C. The distilled ethanol and hydrogen chloride were absorbed in 192.0 g. (1.25 mol) of phosphorus oxychloride at a temperature of −5 to 0° C.

265.0 g. (5.72 mol) of ethanol were recovered. This represents a percentage recovery of 91.5%.

Moreover, after distillation of the unreacted excess alcohol and hydrogen chloride, 193.5 g. of tri-ethylphosphate were obtained from the alcohol-phosphorus oxychloride reaction mixture. This represents a yield of 85%. After absorption of the distilled excess alcohol and hydrogen chloride in the cool phosphorus oxychloride and completion of the reaction, 197.0 g. (4.28 mol) ethanol were reacted with the resultant solution of alkylchlorophosphate. The above-mentioned procedure was repeated, whereby (194.0 g.) of triethylphosphate were obtained, representing a yield of 85%.

EXAMPLE III

Preparation of tri-n-butylphosphate and recovery of n-butanol 153.5 g. (1.0 mol) of phosphorus oxychloride were added dropwise to and reacted with 222.0 g. (3.0 mol) of n-butanol. The reaction was carried out under reduced pressure of 20 mm. Hg at a temperature of 15 to 20° C. After completion of the reaction, the reaction mixture was gradually heated to a temperature of 45 to 55° C. under a reduced pressure of 55 mm. Hg. The resulting reaction mixture was added dropwise to and reacted with 370.0 g. (5 mol) of n-butanol. Excess unreacted n-butanol and hydrogen chloride produced during the reaction were distilled from the reaction mixture under a reduced pressure of 20 mm. Hg, and at a temperature of 100° C. The distilled n-butanol and hydrogen chloride were forthwith absorbed in 153.5 g. (1.0 mol) of phosphorus oxychloride and reacted therewith at a reaction temperature of −5 to 5° C. 340.0 g. (4.6 mol) of n-butanol were recovered. This represents a 92% yield. 218.0 g. of tri-n-butylphosphate (representing an 82.0% yield) were obtained from the reaction solution obtained after distillation of the excess alcohol and hydrogen chloride therefrom 251.0 g. (3.4 mol) of n-butanol were added to the reaction mixture obtained upon reacting the absorbed distilled excess alcohol with the cold phosphorus oxychloride and reacted. 217.0 g. of tri-n-butylphosphate were obtained, representing a yield of 81.5%.

What is claimed is:

1. A process for the preparation of a trialkylphosphate having the formula:

wherein R is an alkyl group having 1 to 4 carbon atoms, which comprises the steps of reacting phosphorus oxychloride with an alcohol having the formula:

wherein R is as defined above at a temperature of −10 to 50° C. said alcohol being present in an amount in excess of the stoichiometric amount required for complete reaction with said phosphorus oxychloride, whereby a reaction mixture containing said trialkyl phosphate, hydrogen chloride and excess unreacted alcohol is obtained; distilling the hydrogen chloride and the excess alcohol from the reaction mixture, said distillation being carried out under reduced pressure; introducing the distilled excess unreacted alcohol and the hydrogen chloride into phosphorus oxychloride at a temperature of −20 to 5° C. and reacting the introduced distilled excess unreacted alcohol with the phosphorus oxychloride to produce an alkylchlorophosphate solution and separate the hydrogen chloride from the solution; then adding an additional amount of said alcohol to the alkylchlorophosphate solution to produce said trialkylphosphate.

2. The process as recited in claim 1 wherein the reaction mixture is distilled at a pressure of 20–50 mm. Hg.

3. The process as recited in claim 1 wherein the distilled excess unreacted alcohol and hydrogen chloride are introduced in a gaseous state into the phosphorus oxychloride.

4. The process as recited in claim 1 wherein the distilled excess unreacted alcohol and hydrogen chloride are introduced in a liquid state into the phosphorus oxychloride.

5. The process as recited in claim 1 wherein the amount of alcohol in excess of the stoichiometric amount required for complete reaction with the phosphorus oxychloride at a temperature of −10 to 50° C. is from 1–8 mol.

6. The process as recited in claim 1 wherein the distilled unreacted alcohol and hydrogen chloride are introduced into phosphorus oxychloride at a temperature of −10–5° C.

7. The process as recited in claim 1 wherein the alcohol is methanol, ethanol, n-propyl alcohol, iso-propyl alcohol, n-butanol, iso-butanol, or tert-butanol.

References Cited

UNITED STATES PATENTS 2,426,691  9/1947  Jenkins _____ 260—973
3,053,875  9/1962  Brown et al. _____ 260—973

ANTON H. SUTTO, Primary Examiner

U.S. Cl. X.R.

260—963, 974